US006463549B1

United States Patent
Shperber et al.

(10) Patent No.: US 6,463,549 B1
(45) Date of Patent: Oct. 8, 2002

(54) DEVICE AND METHOD FOR PATCHING CODE RESIDING ON A READ ONLY MEMORY MODULE UTILIZING A RANDOM ACCESS MEMORY FOR STORING A SET OF FIELDS, EACH FIELD INDICATING VALIDITY OF CONTENT OF A GROUP, AND FOR RECEIVING AN ADDRESS OF A MEMORY PORTION OF THE READ ONLY MEMORY

(75) Inventors: Shai Shperber, Bat Hefer; Dmitri Akselrod, Herzlia, both of (IL)

(73) Assignee: Motorola, Inc., Schaumburg, IL (US)

( * ) Notice: Subject to any disclaimer, the term of this patent is extended or adjusted under 35 U.S.C. 154(b) by 98 days.

(21) Appl. No.: 09/677,695

(22) Filed: Sep. 28, 2000

(51) Int. Cl.[7] .............................................. G06F 12/00
(52) U.S. Cl. .......................... 714/7; 714/710; 711/162; 365/200
(58) Field of Search ................................. 711/163, 202, 711/102, 162; 713/100; 714/7, 8, 48, 710; 365/200

(56) References Cited

U.S. PATENT DOCUMENTS

| | | | | |
|---|---|---|---|---|
| 4,028,684 A | * | 6/1977 | Divine et al. ................ | 711/103 |
| 4,542,453 A | * | 9/1985 | Patrick et al. ................ | 710/48 |
| 4,831,517 A | * | 5/1989 | Crouse et al. ................ | 714/8 |
| 4,982,360 A | | 1/1991 | Johnson et al. ............. | 711/108 |
| 5,623,665 A | * | 4/1997 | Shimada et al. ............... | 714/5 |
| 5,757,690 A | | 5/1998 | McMahon ................... | 365/104 |
| 5,813,043 A | * | 9/1998 | Iles et al. .................... | 711/102 |
| 5,901,225 A | * | 5/1999 | Ireton et al. ................... | 714/7 |
| 6,073,252 A | * | 6/2000 | Moyer et al. ................. | 714/48 |
| 6,076,134 A | * | 6/2000 | Nagae ........................... | 711/1 |
| 6,158,018 A | * | 12/2000 | Bernasconi et al. .......... | 714/54 |
| 6,260,157 B1 | * | 7/2001 | Schurecht et al. .......... | 711/202 |
| 6,282,647 B1 | * | 8/2001 | Leung et al. ................ | 709/221 |

FOREIGN PATENT DOCUMENTS

GB 2292470 A * 2/1996 ........... G06F/11/20

* cited by examiner

*Primary Examiner*—Hong Kim

(57) ABSTRACT

A device and a method for patching code residing on a ROM module, the device comprising a patch detect logic and a patch translation logic, the method comprising the steps of: (I) providing a set of M fields, each field indicating a validity of a content of a GROUP of at least two memory words stored in the ROM module. (II) receiving a request to provide a content of a requested memory portion located at an ADDRESS within the ROM module, the requested memory word being a part of a requested GROUP, the requested GROUP is associated to a selected field out of the M fields. (III) fetching a selected field associated to the requested memory portion. (IV) checking the selected field and accordingly either (a) providing a patched code if the selected field indicates that the requested GROUP is not valid; else (b) providing a content of the requested memory portion.

16 Claims, 3 Drawing Sheets

DEVICE AND METHOD FOR PATCHING CODE RESIDING ON A READ ONLY MEMORY MODULE UTILIZING A RANDOM ACCESS MEMORY FOR STORING A SET OF FIELDS, EACH FIELD INDICATING VALIDITY OF CONTENT OF A GROUP, AND FOR RECEIVING AN ADDRESS OF A MEMORY PORTION OF THE READ ONLY MEMORY

FIELD OF THE INVENTION

The present invention relates, in general, to a device and method for patching code residing on a read only memory module, and especially for a device and a method for replacing defective or obsolete portions of said code in a microprocessor adapted to execute said code.

BACKGROUND OF THE INVENTION

There is need to patch defective or obsolete code residing in a read only access memory by overlaying, or substituting, said code with a valid code. One prior art solution involves storing a plurality of trap addresses, each trap address pointing to a portion of an invalid code, and comparing each incoming address to the plurality of trap addresses. This prior art solution usually required a relatively expensive content addressable memory CAM for storing the plurality of trap addresses. Another solution involved storing the plurality of trap addresses in a plurality of dedicated registers. This solution is not cost effective and can usually handle only a limited number of memory patches. Another prior art solution is described in U.S. Pat. No. 5,757,690 of Mcmahon. Said patent describes an embedded ROM module with Random Access Memory RAM module valid bits for fetching code updates from an external memory. Each memory word in the ROM module is associated to a dedicated RAM bit which indicates if the content of said memory word is valid or if it there is a need in fetching a valid word from an external RAM module. This prior art solution is also memory consuming.

There is a need to provide an effective method and device for patching code residing on a read only memory module, that overcomes said disadvantages of the prior art solutions.

BRIEF DESCRIPTION OF THE DRAWINGS

While the invention is pointed out with particularity in the appended claims, other features of the invention are disclosed by the following detailed description taken in conjunction with the following figures in which:

DETAILED DESCRIPTION OF THE INVENTION

It should be noted that the particular terms and expressions employed and the particular structural and operational details disclosed in the detailed description and accompanying drawings are for illustrative purposes only and are not intended to in any way limit the scope of the invention as described in the appended claims.

The invention provides a device and method for patching code residing on a ROM module, the device comprises of a patch detection logic having a RAM module that can also store information that is not related to a validity of code stored in the ROM module.

The invention provides a device and method for patching code residing on a read only memory module, the device comprises of a patch detection logic that stores a plurality of field, each field indicated a validity of a content of a GROUP of at least two memory words of said ROM module.

Accordingly, said device and method are cost effective and are adapted to handle many memory patches.

Figure 1:
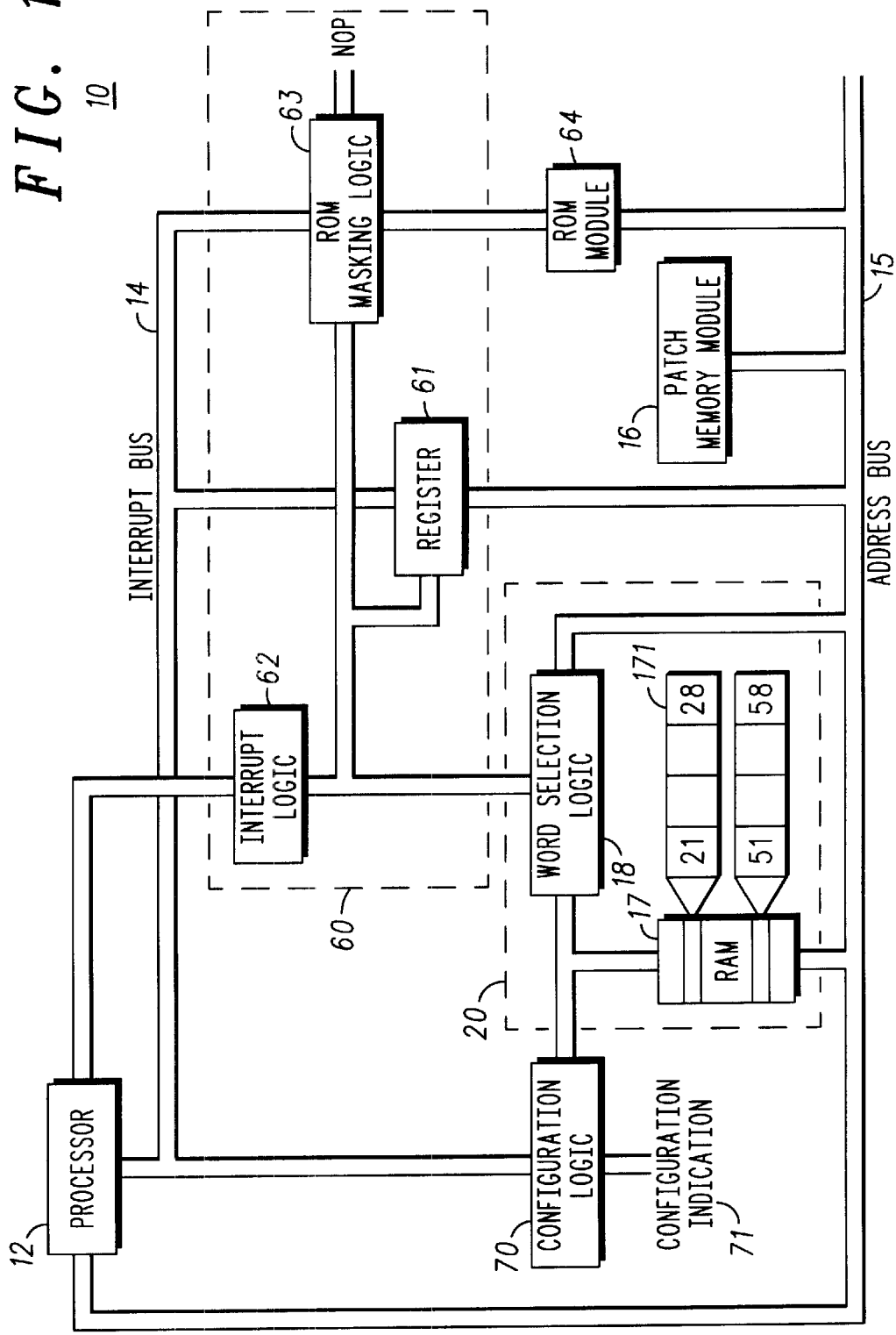
FIG. 1 is a schematic description of a device for patching code residing on a read only memory (i.e.- ROM) module.

Referring to FIG. 1 illustrating device 10 for patching code residing on a read only memory (i.e.- ROM) module 64. Device 10 can either comprise of processor 12 or be coupled to processor 12. FIG. 1 illustrates the latter configuration in which device 10 is adapted to be coupled to processor 12. Device 10 is further adapted to be coupled to an address bus 15 and to an instruction bus 14. Device 10 comprising of patch detect logic 20 and patch translation logic 60.

Patch detect logic 20 is adapted to store M fields 21–58, each field indicating a validity of a content of a GROUP of at least two memory words of ROM module 64. Patch detect logic 20 is coupled to address bus 13 to receive at least a portion of an ADDRESS of a requested memory portion within ROM module 64 and to select accordingly a selected field out of said M fields, M>1.

Conveniently, each field of fields 21–58 is one bit long. Fields 21–58 are stored in a RAM module 17, and each memory word of the RAM module stores a plurality of fields. For example, a first memory word 171 of RAM module 17 stores fields 21–28. When a selected field within a selected memory word is selected, the selected memory word is provided to a word selection logic 18 for extracting the selected field from the selected word. Preferably, a first portion of ADDRESS such as the sixth to tenth least significant bits of ADDRESS are provided to RAM module 17 and select a selected memory word while the second to fifth least significant bits of ADDRESS are provided to word selection logic 18 for selecting a bit out of the selected memory word, the content of said bit is further provided to patch translation logic 60.

According to another preferred embodiment of the invention RAM module 17 can store information that is not related to the patching process. Accordingly, device 10 further comprises of a configuration logic 70 for allowing RAM module 17 to store and provide information that is not related to fields 21–58. When such information is fetched, there is no need to access either ROM module 64 or patch memory module 16. Therefore, configuration logic 70 is adapted to prevent patch translation device 60 from providing patched code to processor 12. Configuration logic 70 can bypass the output of the word selection logic 18 so that the full content of a memory word of RAM module 17 is provided. Conveniently, configuration logic 70 is responsive to a configuration indication 71.

Patch translation logic 60 is adapted to receive the selected field and to either:

(a) Provide a content of the requested memory portion to processor 12, if the selected field indicates that the requested memory portion is a part of a GROUP having a valid content.

(b) Provide processor 12 a patched code from a patch memory module 16 accessed by patch translation logic 60, if the selected field indicates that the requested memory portion is a part of a GROUP having a non valid content.

Conveniently, patch translation logic 60 comprises of: register 61 and interrupt logic 62. Register 61 is adapted to store at least a portion of ADDRESS 15 when the selected field indicates that the requested memory portion is a part of a GROUP having a non valid content. Register 61 is coupled to the processor.

Interrupt logic 62, adapted to receive the selected field and accordingly to provide an interrupt request to processor 12. Processor 12 is adapted to respond to the interrupt request by reading the content of register 61 and fetching from patch memory module 16 patched code pointed by at least a portion of the ADDRESS. Conveniently, processor 12 is adapted to reset the interrupt request after fetching the patched code.

Preferably, patch translation logic 60 further comprises ROM masking logic 63, for preventing ROM module 64 from providing non valid code. ROM masking logic 63 is implemented by a multiplexer having a first input, coupled to an output of ROM module 64 and a second input coupled to a unit for providing 'NOP' signals. The multiplexer is controlled by the selected field so that if a requested content of ROM module is valid said content is provided to processor 12, and if the content is not valid the 'non operation' 'NOP' signals are provided to processor 12 in order not to interfere with the provision of the patched code to processor 12.

Figure 2:
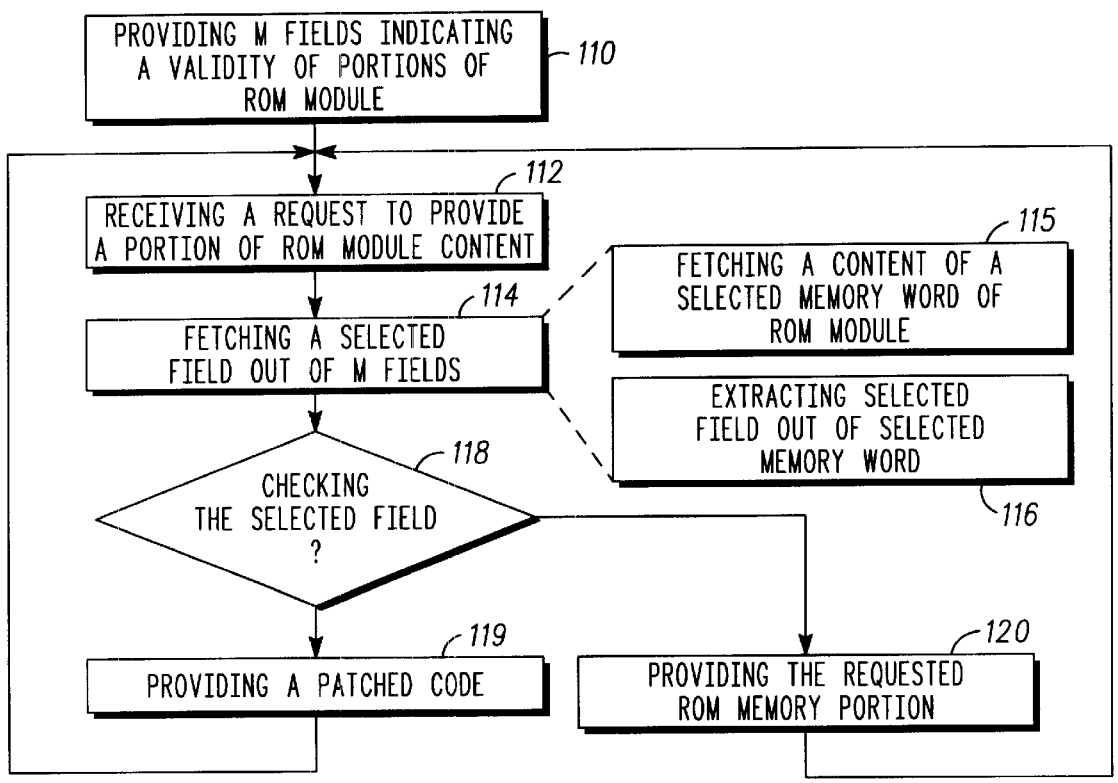
FIGS. 2–3 are schematic flow chart illustrating methods for patching code residing on ROM module according to two preferred embodiments of the invention.

FIG. 2 is a schematic flow chart illustrating method 100 for patching code residing on ROM module 64, according to a preferred embodiment of the invention.

Method 100 comprising the steps of:

Providing (step 110) a set of M fields, each field indicating a validity of a content of a GROUP of at least two memory words stored in ROM module 64.

Receiving (step 112) a request to provide a content of a requested memory portion located at an ADDRESS within ROM module 64, the requested memory word being a part of a requested GROUP, the requested GROUP is associated to a selected field out of the M fields. Conveniently, each field is one bit long.

Fetching (step 114) a selected field associated to the requested memory Portion. Checking (step 118) the selected field and accordingly either (a) providing (step 119) a patched code if the selected field indicates that the content of the requested GROUP is not valid, or (b) providing (step 120) a content of the requested memory portion.

Conveniently, step 114 involves (a) fetching (step 115) a selected memory word from RAM module 17, the selected memory word stores a plurality of fields out of the M fields, whereas one of the plurality of fields is the selected field; (b) extracting (step 116) the selected field out of the selected memory word. Step 119 involves generating an interrupt request to processor 12, that is adapted to receive the patched code, wherein processor 12 is adapted to respond to the interrupt request by reading at least a portion of the ADDRESS and fetching the patched code that is associated to at least said portion of the ADDRESS.

Figure 3:
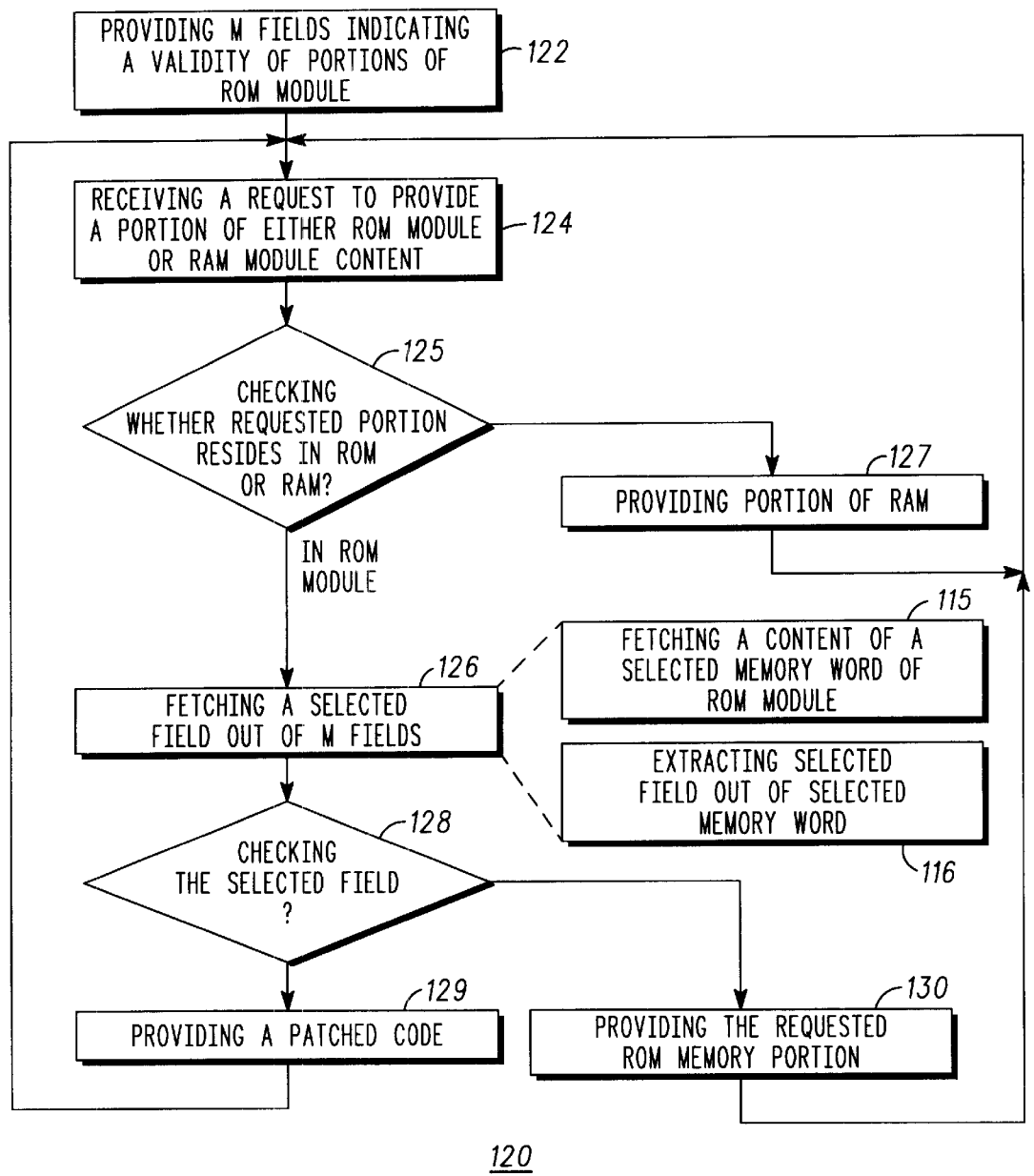

FIG. 3 is a schematic flow chart illustrating method 120 for patching code residing on ROM module 64, according to another preferred embodiment of the invention. Method 120 comprising the steps of:

Providing (step 122) a set of M fields, each field indicating a validity of a content of a GROUP of at least two memory words stored in ROM module 64.

Receiving (step 124) a request to provide a content of a requested memory portion located at an ADDRESS either within ROM module 64 or within RAM module 17, a requested memory portion located in ROM module 64 being a part of a requested GROUP, the requested GROUP is associated to a selected field out of the M fields. Conveniently, each of the M fields is one bit long.

Fetching (step 126) a selected field associated to the requested memory Portion. Checking (step 127) the selected field and accordingly either (a) providing a patched code if the selected field indicates that the content of the requested GROUP is not valid; or, (b) providing (step 120) a content of the requested memory portion.

Conveniently, step 126 is preceded by step 125 of determining if the requested memory portion is located in ROM module 64 or in RAM module. If the requested memory module resided in the RAM module then step 125 is followed by step 127 of providing said portion, else it is followed by step 126.

It should be noted that the particular terms and expressions employed and the particular structural and operational details disclosed in the detailed description and accompanying drawings are for illustrative purposes only and are not intended to in any way limit the scope of the invention as described in the appended claims.

Thus, there has been described herein an embodiment including at least one preferred embodiment of a device and method for patching code residing on a read only memory module. It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather then the foregoing detailed description.

We claim:

1. A device for patching code residing on a ROM module, the device is adapted to be coupled to a processor, to an address bus and to an instruction bus, the device comprising:

a patch detect logic comprising a RAM module, adapted to store M fields, wherein each of the M fields is one bit long, each field indicating a validity of a content of a GROUP of at least two memory words of said ROM module, wherein said patch detect logic is adapted to receive at least a portion of an ADDRESS of a requested memory portion within the ROM module, said ADDRESS being provided on said address bus and to select accordingly a selected field out of said M fields, M>1; and a patch translation logic, adapted to receive the selected field and to either (a) provide a content of the requested memory portion the processor, if the selected field indicates that the requested memory portion is a part of a GROUP having a valid content; (b) provide to the processor a patched code from a patch memory module accessed by the patch translation logic, if the selected field indicates that the requested memory portion is a part of a GROUP having a non valid content, wherein each memory word of the RAM module is adapted to store a plurality of fields out of the M fields, and wherein the patch detect logic further comprises of a word selection logic, for receiving a content of a selected memory word, the selected memory word stores the selected field, and for providing the selected field.

2. The device of claim 1 wherein a first portion of the ADDRESS is provided to the RAM module, for selecting the selected memory word, and a second portion of the ADDRESS is provided to the word selection logic for selecting the selected field within the selected memory word.

3. The device of claim 1 further comprising a configuration logic, for allowing the patch detector module to store and provide information that is not related to the M fields.

4. The device of claim 3 wherein the configuration logic is responsive to a configuration indication and accordingly is adapted to prevent the patch translation device from providing patched code to the processor.

5. The device of claim 1 wherein the patch translation logic comprising of:
   a register, adapted to store at least a portion of the ADDRESS when the selected field indicates that the requested memory portion is a part of a GROUP having a non valid content; the register means is coupled to the processor;
   an interrupt logic, adapted to receive the selected field and accordingly to provide an interrupt request to the processor, wherein the processor is adapted to respond to the interrupt request by reading the content of the register and to fetch from the patch memory module patched code pointed by at least a portion of the ADDRESS.

6. The device of claim 5 wherein the processor is adapted to reset the interrupt request after fetching the patched code.

7. The device of claim 5 wherein the patch translation logic further comprises of a ROM masking logic, for preventing the ROM module from providing non valid code.

8. A device for patching code residing on a ROM module, the device comprising:
   a processor, for executing instructions being stored in either a ROM module or a patch memory module, the processor is adapted to be coupled to an address bus and an instruction bus;
   a patch detect logic comprising a RAM module, adapted to store M fields wherein each of the M fields in one bit long, each field indicating a validity of a content of a GROUP of at least two memory words of said ROM module, wherein said patch detect logic is adapted to receive at least a portion of an ADDRESS of a requested memory portion within the ROM module, said ADDRESS being provided on said address bus and accordingly to select a selected field out of said M fields, M>1; and
   a patch translation logic, adapted to receive the selected field and to either (a) provide a content of the requested memory portion to the processor, if the selected field indicates that the requested memory portion is a part of a GROUP having a valid content; (b) provide to the processor a patched code from a patch memory module accessed by the patch translation logic, if the selected field indicates that the requested memory portion is a part of a GROUP having a non valid content, wherein each memory word of the RAM module is adapted to store a plurality of fields out of the M fields, and
   wherein the patch detect logic further comprises of a word selection logic, for receiving a content of a selected memory word, the selected memory word stores the selected field, and for providing the selected field.

9. The device of claim 8 wherein a first portion of the ADDRESS is provided to the RAM module, for selecting the selected memory word, and a second portion of the ADDRESS is provided to the word selection logic for selecting the selected field within the selected memory word.

10. The device of claim 8 further comprising a configuration logic, for allowing the patch detector module to store and provide information that is not related to the M fields.

11. The device of claim 10 wherein the configuration logic is responsive to a configuration indication and accordingly is adapted to prevent the patch translation device from providing patched code to the processor.

12. The device of claim 8 wherein the patch translation logic comprises of:
   a register, adapted to store at least a portion of the ADDRESS when the selected field indicates that the requested memory portion is a part of a GROUP having a non valid content; the register is coupled to the processor;
   an interrupt logic, adapted to receive the selected field and accordingly to provide an interrupt request to the processor, wherein the processor is adapted to respond to the interrupt request by reading the content of the register and to fetch from the patch memory module patched code pointed by at least a portion of the ADDRESS.

13. The device of claim 12 wherein the processor is adapted to reset the interrupt request after fetching the patched code.

14. The device of claim 12 wherein the patch translation logic further comprises of a ROM masking logic, for preventing the ROM module from providing non valid code.

15. A method for patching code residing on a ROM module, the method comprising the steps of:
   providing a set of M fields wherein each of the M fields is one bit long, each field indicating a validity of a content of a GROUP of at least two memory words stored in the ROM module;
   receiving a request to provide a content of a requested memory portion located at an ADDRESS within the ROM module, the requested memory word being a part of a requested GROUP, the requested GROUP is associated to a selected field out of the M fields;
   fetching a selected field associated to the requested memory portion; and
   checking the selected field and accordingly either (a) providing a patched code if the selected field indicates that the requested GROUP is not valid; else (b) providing a content of the requested memory portion, and wherein the step of fetching the selected field comprises the steps of:
   fetching a selected memory word from a RAM module, the selected memory word stores a plurality of fields out of the M fields, whereas one of the plurality of fields is the selected field;
   extracting the selected field out of the selected memory word.

16. The method of claim 15 wherein the step of providing a patched code further comprises the steps of:
   generating an interrupt request to a processor, that is adapted to receive the patched code, the processor is adapted to respond to the interrupt request by reading at least a portion of the ADDRESS and fetching the patched code that is associated to at least said portion of the ADDRESS.

* * * * *

UNITED STATES PATENT AND TRADEMARK OFFICE
CERTIFICATE OF CORRECTION

PATENT NO.   : 6,463,549 B1
DATED        : October 8, 2002
INVENTOR(S)  : Shperber et al.

Page 1 of 1

It is certified that error appears in the above-identified patent and that said Letters Patent is hereby corrected as shown below:

Column 5,
Line 37, change "fields in" to -- fields is --

Column 6,
Line 23, change "claim 12" to -- claim 8 --

Signed and Sealed this

Nineteenth Day of August, 2003

JAMES E. ROGAN
*Director of the United States Patent and Trademark Office*